US011118617B1

United States Patent
Isensee et al.

(10) Patent No.: US 11,118,617 B1
(45) Date of Patent: Sep. 14, 2021

(54) TABLE LEG ATTACHMENT

(71) Applicant: Valley Design Enterprises, Inc., Fountain, MN (US)

(72) Inventors: Loren Leslie Isensee, Chatfield, MN (US); Duane Eric Solberg, Stewartville, MN (US); Timothy Michael Simpson, Chatfield, MN (US)

(73) Assignee: VALLEY DESIGN ENTERPRISES INC, Fountain, MN (US)

( * ) Notice: Subject to any disclaimer, the term of this patent is extended or adjusted under 35 U.S.C. 154(b) by 340 days.

(21) Appl. No.: 16/382,770

(22) Filed: Apr. 12, 2019

Related U.S. Application Data

(60) Provisional application No. 62/664,452, filed on Apr. 30, 2018.

(51) Int. Cl.
*F16B 12/50* (2006.01)
*A47B 13/02* (2006.01)
*F16B 12/44* (2006.01)

(52) U.S. Cl.
CPC ............ *F16B 12/50* (2013.01); *A47B 13/021* (2013.01); *A47B 2013/022* (2013.01); *F16B 2012/446* (2013.01); *F16B 2012/505* (2013.01)

(58) Field of Classification Search
CPC .... F16B 12/44; F16B 12/50; F16B 2012/505; F16B 2012/446; A47B 13/021; A47B 2013/022
See application file for complete search history.

(56) References Cited

U.S. PATENT DOCUMENTS

| 110,013 A | 12/1870 | Cougle |
| 1,208,924 A | 12/1916 | Deming |
| 1,945,197 A | 1/1934 | Koch |
| 3,341,160 A * | 9/1967 | Jones, III ............... A47B 13/06 248/165 |
| 3,353,854 A | 11/1967 | Hansen |
| 3,572,787 A * | 3/1971 | Timmerman ........... F16B 12/44 403/205 |
| 3,981,251 A | 9/1976 | Damberg |

(Continued)

FOREIGN PATENT DOCUMENTS

| CH | 403207 A * | 11/1965 | ............... F16B 12/50 |
| DE | 3930614 A1 * | 3/1990 | ............... F16B 12/52 |

(Continued)

*Primary Examiner* — Daniel J Rohrhoff
(74) *Attorney, Agent, or Firm* — Mai-Tram D. Lauer; Westman, Champlin & Koehler, P.A.

(57) ABSTRACT

An assembly includes an elongated channel member, a clip and a leg. The clip includes a hook proximate the first end of the clip, a fastener proximate the second end of the clip, and a pivot protrusion disposed between the first and second ends of the clip. The clip is attached to the first end of the elongated channel member. The leg is oriented at a first angle to the elongated channel member and adjacent the first end of the elongated channel member. The leg includes an opening. The hook of the clip is configured for insertion into the opening of the leg. Using the fastener to move the second end of the clip toward a surface of the elongated channel member causes the hook of the clip to rotate about the pivot protrusion, thereby engaging a surface of the leg. A method is described for assembling a structure.

20 Claims, 4 Drawing Sheets

(56) References Cited

U.S. PATENT DOCUMENTS

| | | | | |
|---|---|---|---|---|
| 4,167,353 | A | * | 9/1979 | Gebhardt ................ F16B 12/50 |
| | | | | 220/684 |
| 4,766,821 | A | | 8/1988 | Pauer |
| 4,900,108 | A | * | 2/1990 | Tischer ............... A47B 47/0008 |
| | | | | 312/265.3 |
| 5,074,224 | A | | 12/1991 | Stascheit |
| 8,136,460 | B2 | | 3/2012 | Tait |
| 2002/0090256 | A1 | * | 7/2002 | Chin ....................... F16B 12/44 |
| | | | | 403/175 |
| 2009/0180830 | A1 | | 7/2009 | MacLean |
| 2013/0306808 | A1 | * | 11/2013 | Huang ................... A47B 13/06 |
| | | | | 248/163.1 |
| 2017/0261022 | A1 | * | 9/2017 | Schirmer ................ F16B 12/54 |
| 2019/0223587 | A1 | * | 7/2019 | Patton .................... F16B 12/44 |
| 2019/0301504 | A1 | * | 10/2019 | Nelson .................... F16B 12/50 |
| 2020/0116183 | A1 | * | 4/2020 | Hirose ................ A47B 13/021 |
| 2020/0362898 | A1 | * | 11/2020 | Ronda .................... F16B 12/50 |

FOREIGN PATENT DOCUMENTS

| | | | | |
|---|---|---|---|---|
| FR | 2142679 | A1 * | 2/1973 | ............. F16B 12/50 |
| GB | 1330167 | | 9/1973 | |

\* cited by examiner

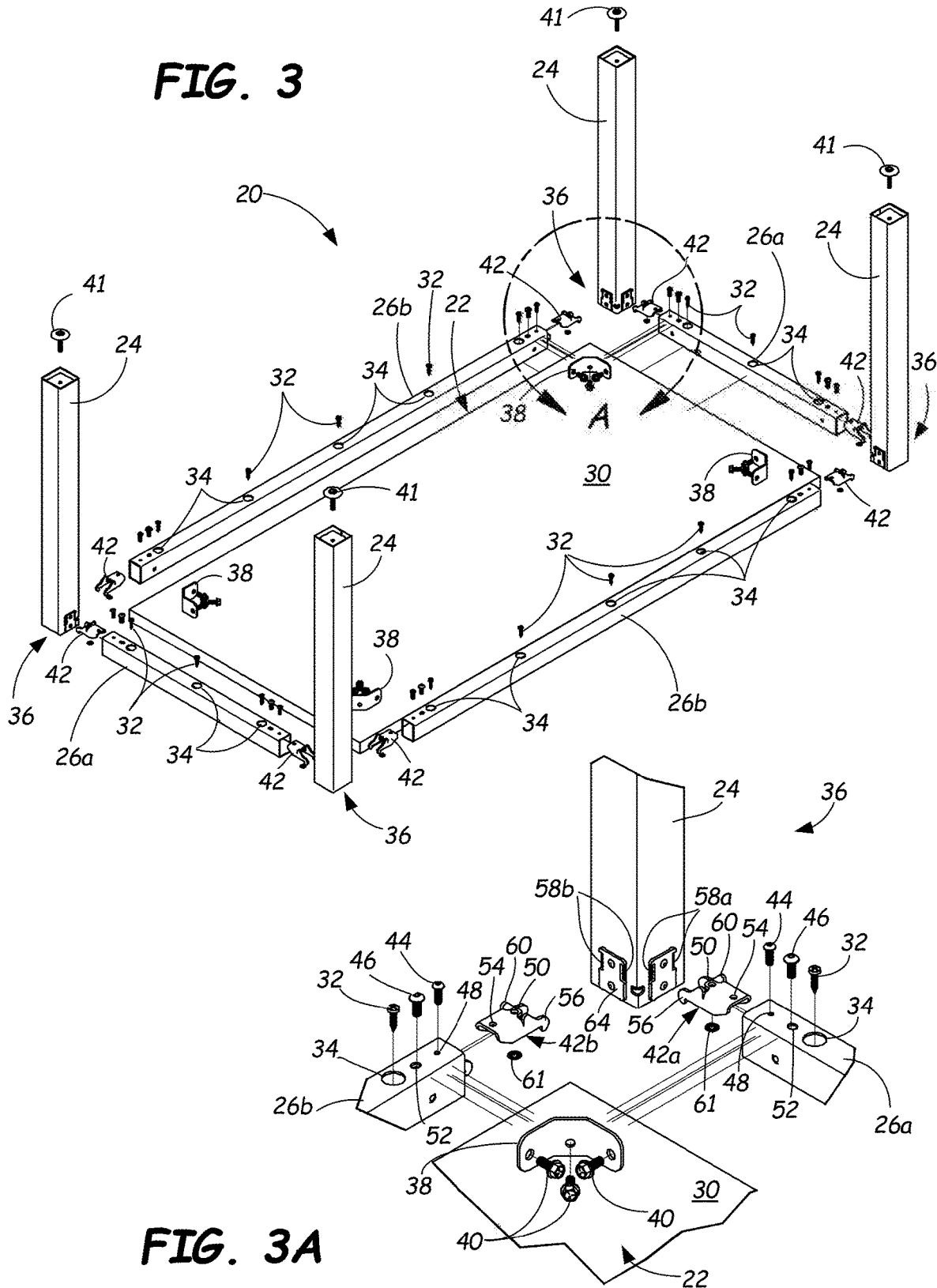

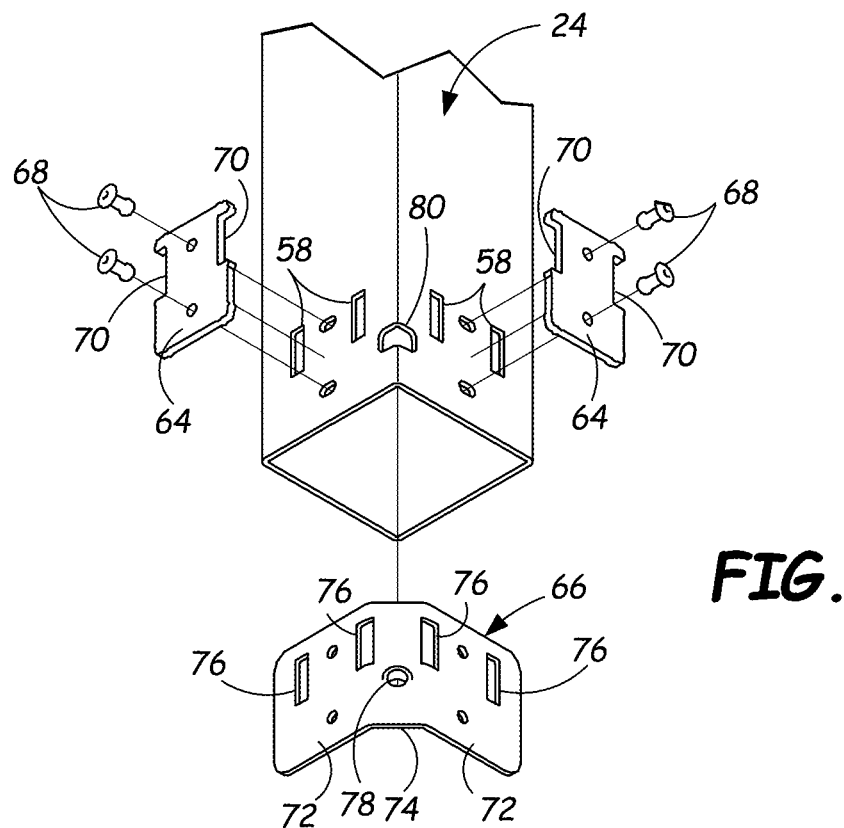
FIG. 8
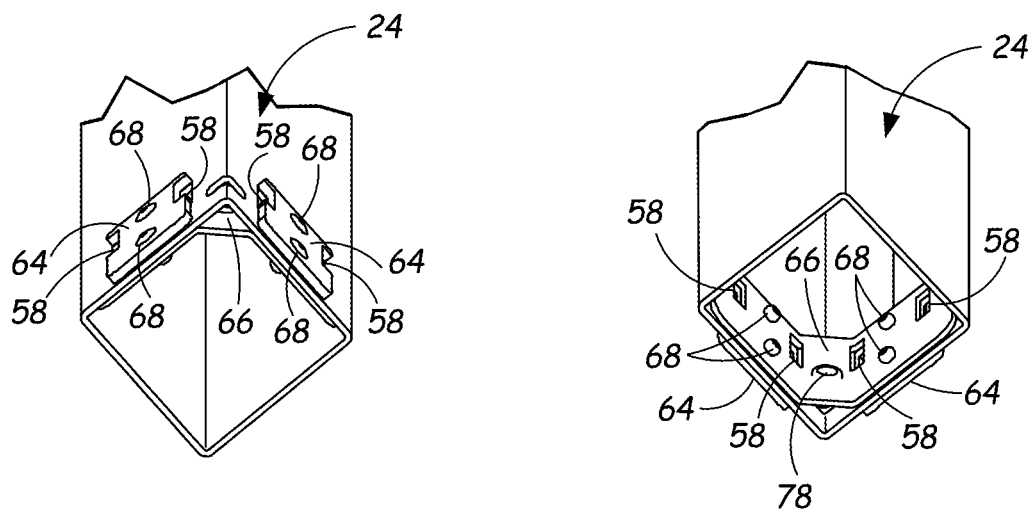
FIG. 9
FIG. 10

TABLE LEG ATTACHMENT

CROSS REFERENCE TO RELATED APPLICATION

This application claims the benefit of priority from U.S. Provisional Patent Application No. 62/664,452, filed on Apr. 30, 2018, which is fully incorporated by reference herein.

BACKGROUND

It is desirable in furniture design to provide pieces in a disassembled manner to allow for flat packing and space savings in storage and transport. At the furniture store or home or business of an ultimate purchaser, assembly of the furniture pieces together is preferably quick, easy, and able to be completed with widely available tools. It is also desirable that such assembly can be accomplished by a single person. Accordingly, the present disclosure describes a leg attachment assembly, which can be used for a table for example, which provides an easily assembled and strong attachment to a slab such as a table top. While the attachment assembly is described and illustrated with respect to a table, it is also contemplated that the described assembly can be used for other structures having legs projecting orthogonally from a slab, board or panel surface such as, for example, chairs, benches, stages, shelves, beds, and other suitable products.

SUMMARY

In one aspect, an assembly includes an elongated channel member, a clip and a leg. The elongated channel member has opposed first and second ends. The clip has opposed first and second ends and includes a hook proximate the first end of the clip, a fastener proximate the second end of the clip, and a pivot protrusion disposed between the first and second ends of the clip. The clip is attached to the first end of the elongated channel member. The leg is oriented at a first angle to the elongated channel member and adjacent the first end of the elongated channel member. The leg includes an opening. The hook of the clip is configured for insertion into the opening of the leg. Using the fastener to move the second end of the clip toward a surface of the elongated channel member causes the hook of the clip to rotate about the pivot protrusion, thereby engaging a surface of the leg.

In another aspect, a method for assembling a structure from a kit includes positioning the first end of the elongated channel member at a first angle to and proximate the leg; aligning the hook of the clip with the opening of the leg; inserting the hook of the clip into the opening of the leg; and using the fastener to move the second end of the clip toward a surface of the elongated channel member to cause the hook of the clip to rotate about the pivot protrusion, thereby engaging a surface of the leg.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 3 is an exploded view of the table as oriented in FIG. 2A.

FIG. 3A is an enlarged view of the encircled portion "A" of FIG. 3.

FIG. 8 is a perspective view of an end portion of a leg in an exploded configuration.

FIG. 9 is an assembled view of the components shown in FIG. 8.

FIG. 10 shows the leg from the rear, as compared to FIG. 9.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art that fall within the scope of the principles of this disclosure.

The figures may not be drawn to scale. In particular, some features may be enlarged relative to other features for clarity. Moreover, where terms such as above, below, over, under, top, bottom, side, right, left, vertical, horizontal, etc., are used, it is to be understood that they are used only for ease of understanding the description. It is contemplated that structures may be oriented otherwise.

DETAILED DESCRIPTION

Figure 1:
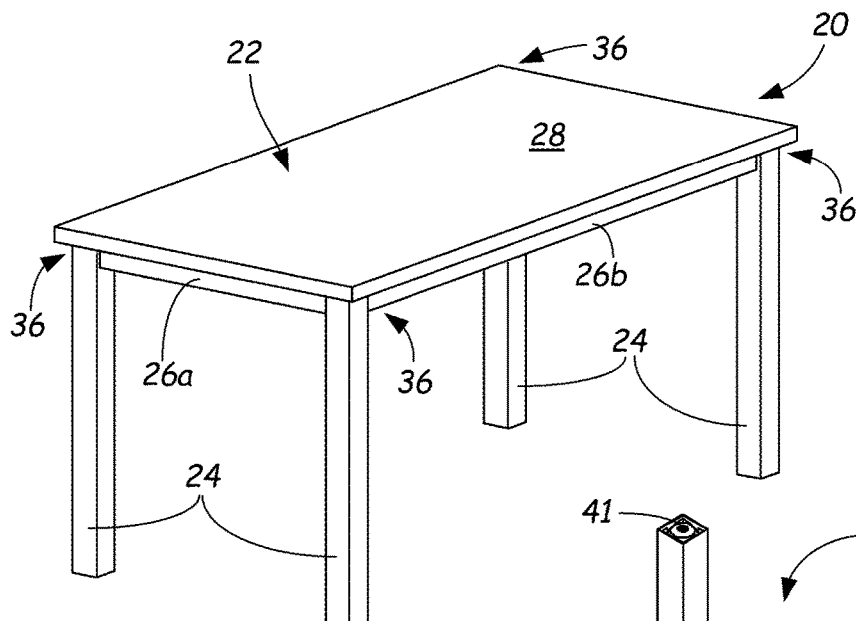
FIG. 1 is a top perspective view of an exemplary table having a leg attachment assembly of the present disclosure.
Figure 2A:
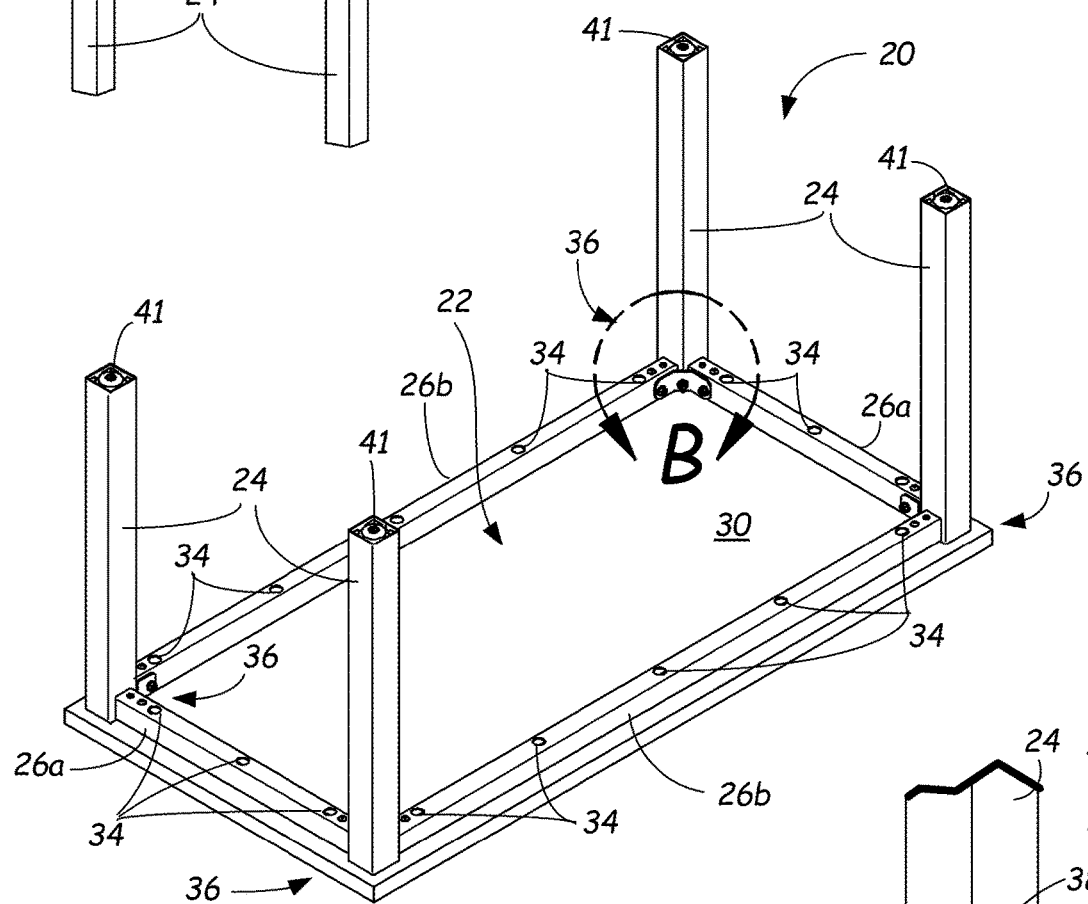
FIG. 2A is a perspective view of the table of FIG. 1 in an inverted orientation.

FIG. 1 is a top perspective view of an exemplary table 20 embodying the attachment features of this disclosure. Table 20 includes a slab 22 with legs 24 connected thereto by aprons 26. FIG. 2A shows an inverted table 20. Slab 22 forming a table top includes working surface 28 and underside surface 30. In an exemplary embodiment, elongated channel members such as aprons 26 are connected to slab 22 by fasteners 32 (labeled in FIGS. 3, 3A and 7) inserted through apertures 34 and into underside surface 30 of slab 22. Legs 24 are connected to aprons 26 at each corner 36 of table 20.

Figure 2B:
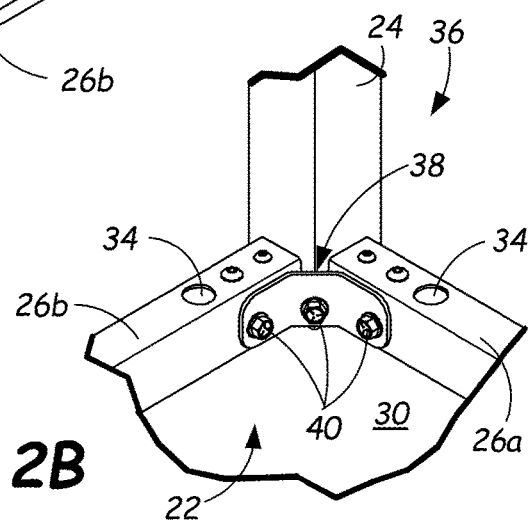
FIG. 2B is an enlarged view of the encircled portion "B" of FIG. 2A.

To simplify construction and assembly of table 20, in exemplary embodiments, aprons 26*a*, 26*b* are identical except in length. Two shorter aprons 26*a* are identical to each other and two longer aprons 26*b* are identical to each other. All four legs 24 are preferably identical. In this application, the features of components at a corner 36 of an assembly of a leg 24 and two orthogonally oriented aprons 26 are described. However, it is to be understood that the structures at the other corners 36 are substantially identical. As shown in FIG. 2B, leg 24 is connected to orthogonally oriented aprons 26, and the assembly is reinforced by angled plate 38, which is attached to each leg 24 and two orthogonally attached aprons 26.

FIG. 3 is an exploded view of the components of table 20, as oriented in FIG. 2A. In the illustrated embodiment, each leg 24 includes an attachable foot 41. In an exemplary embodiment, each foot 41 serves a leveling function by being adjustably threadably attachable to an end of leg 24. However, in other embodiments, such a foot 41 could be replaced with a caster or other floor engaging device. Each apron 26 is configured as an elongated member having, at least adjacent its ends, a hollow body with a substantially square channel cross-section. As shown in FIGS. 3-7, a clip 42 is configured to be disposed within each end of apron 26. Clip 42 is configured for engagement with legs 24.

Figure 4:
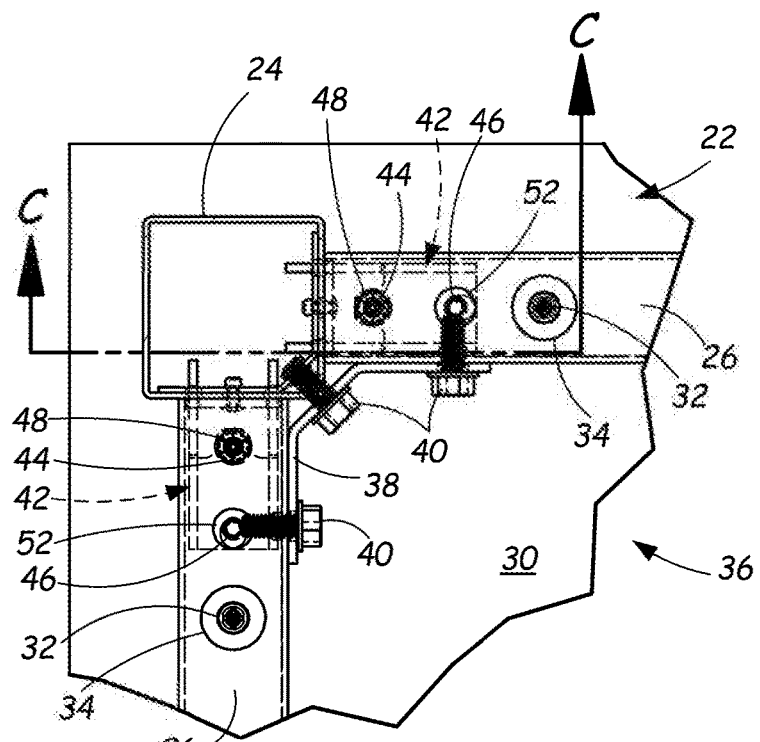
FIG. 4 is a bottom view of a corner of the exemplary table, showing interior features in hidden lines.
Figure 5:
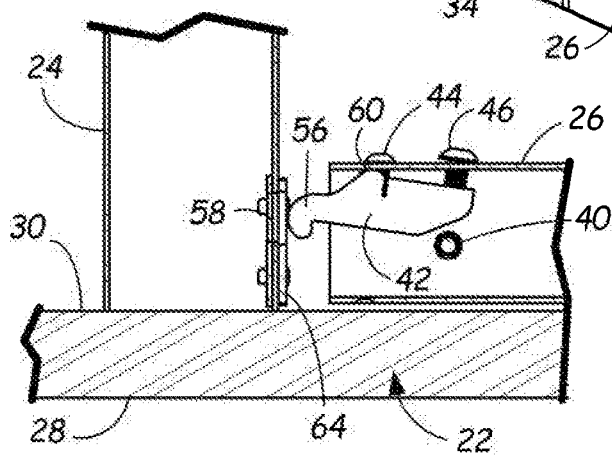
FIGS. 5, 6 and 7 are cross-sectional views taken along line C-C of FIG. 4, showing sequential steps in the connection of an elongated apron member to a table leg.
Figure 6:
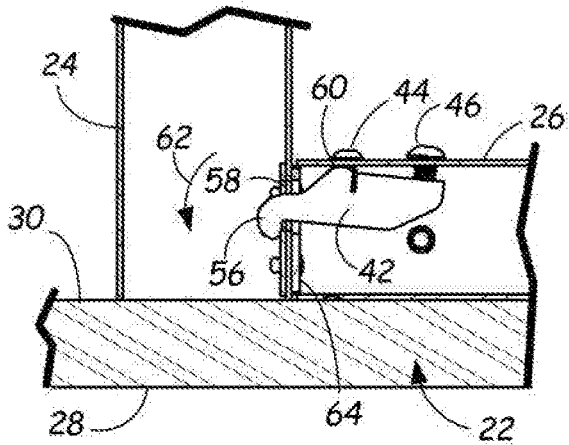
Figure 7:
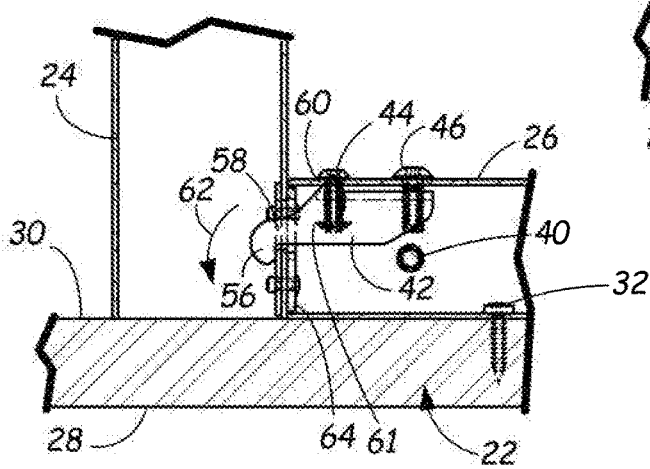

FIG. 4 is a bottom view of a corner 36 of table 20, with hidden features shown in broken lines. FIGS. 5, 6 and 7 are cross-sectional views taken along line C-C of FIG. 4, wherein the apron 26 and leg 24 are in various stages of mutual attachment. As shown in FIGS. 4-7, clip 42 is located partially within the hollow space or channel of apron 26. In FIG. 7, one side of clip 42 is shown as being transparent, so that the fasteners 44, 46 are visible. In an exemplary embodiment, clip 42 is attached to apron 26 in a manner that allows some movement about pivot protrusion 60. Clip 42 is attached to apron 26 by fasteners 44 and 46. As shown in FIG. 3A, in an exemplary embodiment, fastener 44 is a screw that passes through aperture 48 of apron 26 and aperture 50 of clip 42. In an exemplary embodiment, fastener 44 is a screw that is attached to apron 26 and clip 42 by a push nut 61, which is labeled in FIGS. 3A and 7. In an exemplary embodiment, fastener 46 is a screw that passes through aperture 52 of apron 26 and aperture 54 of clip 42. In an exemplary embodiment, clip 42 includes two hooks 56, each hook 56 configured for insertion into slot 58 of leg 24. As shown in FIG. 5, the attachment of clip 42 to apron 26 via fastener 46 is relatively loose, to allow clip 42 to pivot around pivot protrusion 60, which is configured as a curved top surface of a projection on each side of clip 42.

To attach apron 26 with clip 42 therein to leg 24, hooks 56 of clip 42 are aligned for insertion into slots 58 of leg 24. As shown in FIGS. 6 and 7, after the insertion of hook 56 into slot 58, a user tightens fastener 46, which passes through aperture 52 of apron 26 and aperture 54 of clip 42. The assembly elements are configured so that tightening of fastener 46 causes the portion of clip 42 surrounding aperture 54 to travel up fastener 46 (such as caused by threads of fastener 46 spiraling downward through aperture 54), to thereby cause a pivoting of clip 42 about pivot protrusion 60. This pivoting of clip 42 about pivot protrusions 60 causes hooks 56 to travel in the direction of arc 62 to tightly pull apron 26 and leg 24 together and engage a solid portion of leg 24 below slot 58.

FIGS. 8-10 show reinforcement plates 64 provided on leg 24 about slots 58 to add strength and reinforcement at the connection between apron 26 and leg 24 at clips 42. In an exemplary embodiment, an interior corner of each leg 24 includes exterior plates 64 and interior plate 66 attached to leg 24 with fasteners 68 through aligned apertures. In an exemplary embodiment, each exterior plate 64 has a notch 70 aligned with slot 58 to allow hook 56 of clip 42 to pass adjacent notches 70 and through slot 58. While notch 70 is illustrated as a notch in an outside perimeter of exterior plate 64, it is contemplated that the same function may also performed by a slot formed in a larger exterior plate 64.

In an exemplary embodiment, interior plate 66 is an angled plate having two mutually orthogonal portions 72 connected by a corner portion 74. Interior plate 66 includes slots 76, configured for alignment with slots 58 of leg 24. Moreover, interior plate 66 includes a tapped aperture 78, which is aligned with aperture 80 of leg 24. Both of apertures 78 and 80 are configured to accept fastener 40 (labeled in FIGS. 2B and 3A), which also passes through a central aperture of angled plate 38. A construction of angled plate 38 is similar to that of interior plate 66, in that angled plate 38 also includes two mutually orthogonal sections joined by a connecting portion.

In an exemplary embodiment, some components of table 20 will already be assembled prior to shipment to a vendor or ultimate customer. For example, it is contemplated that each leg 24 will include exterior plate 64 and interior plate 66 attached thereto, as shown in FIGS. 3, 3A, 9 and 10. Moreover, it is contemplated that clip 42 will be attached to apron 26 with fastener 44 and a relatively loose connection at fastener 46, as shown in FIG. 5. Moreover, feet 41 can be preassembled onto legs 24.

In an exemplary method of assembly, a user is provided with slab 22, four identical legs 24, two longer aprons 26*b*, two shorter aprons 26*a*, and four identical angled brackets 38, along with appropriate fasteners 32 and 40. While an embodiment is shown with two shorter aprons 26*a* and two longer aprons 26*b*, it is contemplated that in a square-shaped table, all apron members 26 can have the same length. Moreover, while a rectangular table is shown, it is contemplated that the connection methods and components described herein, can also be used in other polygonal apron and leg configurations including pentagons, hexagons and octagons, for example. Other configurations can be devised by one of skill in the art. It is contemplated that one of skill can devise legs 24 having appropriately angled surfaces at corners 36 to accommodate different configurations of tables in line with the present disclosure. Such changes will also dictate complementary changes in the angles of components such as angled bracket 38 and interior plate 66, for example.

In an exemplary method of assembling a table as illustrated, a user aligns hooks 56 with slots 58 of leg 24, as shown in FIG. 5. Hooks 56 are inserted into respectively slots 58. At each corner 36, the user can use a tool such as a screwdriver to tighten fastener 46, thereby engaging two aprons 26 at each corner 36 to a single leg 24. To reinforce this corner connection, the user attaches angled plate 38 to the leg 24 and attached aprons 26 at each corner 36, such as by fasteners 40 through aligned apertures. In an exemplary embodiment, each fastener 40 is a hex head screw, though it is contemplated that other fasteners may also be suitable. Once the table aprons 26 and legs 24 are assembled together, the lower frame of the table 20 can be connected to underside surface 30 of slab 22 via fasteners 32 inserted through apertures 34 and smaller pre-formed holes opposite apertures (not labeled), as shown in FIG. 7, for example.

The described table is also simple to take apart using reverse steps compared its assembly. With the described fasteners and simple tools, no damage is incurred to component pieces by repeated assembly and disassembly. Accordingly, the described leg attachment components offer an easy, quick, strong, and reversible assembly suitable for furniture pieces and other structures.

Exemplary, non-limiting examples of described assemblies and methods follow. As shown in FIGS. 3 and 3A, an assembly includes a first elongated channel member 26*a*, a first clip 42a, and a first leg 24. The first elongated channel member 26a has opposed first and second ends. The first clip 42a has opposed first and second ends, the first clip 42a including a hook 56 proximate the first end of the first clip 42a, a first fastener 46 proximate the second end of the first clip 42a (see FIGS. 4-7), and a first pivot protrusion 60 disposed between the first and second ends of the first clip 42a, wherein the first clip 42a is attached to the first end of the first elongated channel member 26a. A first leg 24 is oriented at a first angle to the first elongated channel member 26a and adjacent the first end of the first elongated channel member 26a, the first leg 24 including a first opening 58a. The hook 56 of the first clip 42a is configured for insertion into the first opening 58a of the first leg 24. Using the first fastener 46 to move the second end of the first clip 42a toward a surface of the first elongated channel member 26a causes the hook 56 of the first clip 42a to rotate about the pivot protrusion 60, thereby engaging a first surface of the first leg 24.

In an exemplary embodiment of an assembly, the first leg 24 includes a second opening 58b and the assembly further includes a second elongated channel member 26b having opposed first and second ends, wherein the second elongated channel member 26b is oriented at a second angle to the first elongated channel member 26b and at a third angle to the first leg 24. A second clip 42b has opposed first and second ends, the second clip 42b including a hook 56 proximate the first end of the second clip 42b, a second fastener 46 proximate the second end of the second clip 42b, and a second pivot protrusion 60 between the first and second ends of the second clip 42b. The second clip 42b is attached to the first end of the second elongated channel member 26b. The hook 60 of the second clip 42b is configured for insertion into the second opening 58b of the first leg 24. Using the second fastener 46 to move the second end of the second clip 42b toward a surface of the second elongated channel member 26b causes the hook 56 of the second clip 42b to rotate about the second pivot protrusion 60, thereby engaging a second surface of the first leg 24. In exemplary embodiments, at least one of the first angle, second angle, and third angle is a right angle or substantially a right angle.

In an exemplary embodiment, an assembly further includes an angled plate 38 configured for attachment to the first elongated channel member 26a, the first leg 24, and the second elongated channel member 26b. In an exemplary embodiment, an assembly further includes a slab 22, wherein the first elongated channel member 26a is configured for attachment to the slab 22.

In an exemplary embodiment of an assembly, the hook 60 of the first clip 42a is one of a pair of hooks 60 of the first clip 42a, the pair of hooks 60 being disposed at opposed sides of the first end of the first clip 42a. In an exemplary embodiment, an assembly further includes an attachment, such as at fastener 44, of a first clip 42a to the first elongated channel 26a proximate the first pivot protrusion 60. In an exemplary embodiment, the attachment is located at the surface of the first elongated channel member 26a. In an exemplary embodiment, the attachment proximate fastener 44 is spaced from the first fastener 46.

In an exemplary embodiment, the first leg 24 includes an exterior plate 64 having a notch 70 configured for alignment with the first opening 58a. In an exemplary embodiment, the first leg 24 includes an interior plate 66 having two mutually orthogonally oriented portions 72 connected by an intermediate portion 74. In an exemplary embodiment, the interior plate 66 includes an aperture 76 configured for alignment with the first opening 58a.

In an exemplary embodiment, a method is described for assembling a structure from a kit including a first elongated channel member 26a, a first clip 42a, and a first leg 24. The method includes positioning the first end of the first elongated channel member 26a at a first angle to and proximate the first leg 24; aligning the hook 56 of the first clip 42a with the first opening 58a of the first leg 24; inserting the hook 56 of the first clip 42a into the first opening 58a of the first leg 24; and using the first fastener 46 to move the second end of the first clip 42a toward a surface of the first elongated channel member 26a to cause the hook 56 of the first clip to rotate about the first pivot protrusion 60, thereby engaging a first surface of the first leg 24. In an exemplary embodiment, the first fastener 46 is a screw and the method includes turning the screw.

In an exemplary embodiment, the kit further includes a second elongated channel member 26b and a second clip 42b. The method includes positioning the first end of the second elongated channel member 26b at a second angle to and proximate the first leg 24, including positioning the second elongated channel member 26b at a third angle to the first elongated channel member 26a. In exemplary embodiments, at least one of the first angle, second angle, and third angle is a right angle or substantially a right angle. In an exemplary embodiment, the method includes aligning the hook 56 of the second clip 46b with a second opening 58b of the first leg 24; inserting the hook 56 of the second clip 46b into the second opening 58b of the first leg 24; and using the second fastener 46 to move the second end of the second clip 42b toward a surface of the second elongated channel member 26b to cause the hook 56 of the second clip 42b to rotate about the second pivot protrusion 60, thereby engaging a second surface of the first leg 24.

In an exemplary embodiment, the method further includes attaching an angled plate 38 to the first elongated channel member 26a, the first leg 24, and the second elongated channel member 26b. In an exemplary embodiment, the kit further includes a slab 22, and the method includes attaching the first elongated channel 26a to the slab 22.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

The invention claimed is:
1. An assembly including:
   a first elongated channel member having opposed first and second ends;
   a first clip having opposed first and second ends, the first clip including a hook proximate the first end of the first clip, a first fastener proximate the second end of the first clip, and a first pivot protrusion disposed between the first and second ends of the first clip, wherein the first clip is attached to the first end of the first elongated channel member; and
   a first leg oriented at a first angle to the first elongated channel member and adjacent the first end of the first elongated channel member, the first leg including a first opening;
   wherein the hook of the first clip is configured for insertion into the first opening of the first leg; and
   wherein using the first fastener to move the second end of the first clip toward a surface of the first elongated channel member causes the hook of the first clip to rotate about the pivot protrusion, thereby engaging a first surface of the first leg.

2. The assembly of claim 1 wherein the first angle is a right angle.

3. The assembly of claim 1 wherein the first leg includes a second opening, the assembly further including:
a second elongated channel member having opposed first and second ends, wherein the second elongated channel member is oriented at a second angle to the first elongated channel member and at a third angle to the first leg; and
a second clip having opposed first and second ends, the second clip including a hook proximate the first end of the second clip, a second fastener proximate the second end of the second clip, and a second pivot protrusion between the first and second ends of the second clip, wherein the second clip is attached to the first end of the second elongated channel member;
wherein the hook of the second clip is configured for insertion into the second opening of the first leg; and
wherein using the second fastener to move the second end of the second clip toward a surface of the second elongated channel member causes the hook of the second clip to rotate about the second pivot protrusion, thereby engaging a second surface of the first leg.

4. The assembly of claim 3, wherein the second angle is a right angle.

5. The assembly of claim 3, wherein the third angle is a right angle.

6. The assembly of claim 3 further including an angled plate configured for attachment to the first elongated channel member, the first leg, and the second elongated channel member.

7. The assembly of claim 1, further including a slab, wherein the first elongated channel member is configured for attachment to the slab.

8. The assembly of claim 1, wherein the hook of the first clip is one of a pair of hooks of the first clip, the pair of hooks being disposed at opposed sides of the first end of the first clip.

9. The assembly of claim 1, further comprising an attachment of the first clip to the first elongated channel member proximate the first pivot protrusion.

10. The assembly of claim 9, wherein the attachment is located at the surface of the first elongated channel member.

11. The assembly of claim 9, wherein the attachment is spaced from the first fastener.

12. The assembly of claim 1, wherein the first leg includes an exterior plate having a notch configured for alignment with the first opening.

13. The assembly of claim 1, wherein the first leg includes an interior plate having two mutually orthogonally oriented portions connected by an intermediate portion.

14. The assembly of claim 13, wherein the interior plate includes an aperture configured for alignment with the first opening.

15. A method for assembling a structure from a kit including:
a first elongated channel member having opposed first and second ends;
a first clip having opposed first and second ends, the first clip including a hook proximate the first end of the first clip, a first fastener proximate the second end of the first clip, and a first pivot protrusion disposed between the first and second ends of the first clip, wherein the first clip is attached to the first end of the first elongated channel member; and
a first leg including a first opening;
the method including:
positioning the first end of the first elongated channel member at a first angle to and proximate the first leg;
aligning the hook of the first clip with the first opening of the first leg;
inserting the hook of the first clip into the first opening of the first leg; and
using the first fastener to move the second end of the first clip toward a surface of the first elongated channel member to cause the hook of the first clip to rotate about the first pivot protrusion, thereby engaging a first surface of the first leg.

16. The method of claim 15 wherein the first fastener is a screw and wherein the method of using the first fastener includes turning the screw.

17. The method of claim 15 wherein the kit further includes:
a second elongated channel member having opposed first and second ends; and
a second clip having opposed first and second ends, the second clip including a hook proximate the first end of the second clip, a second fastener proximate the second end of the second clip, and a second pivot protrusion disposed between the first and second ends of the second clip, wherein the second clip is attached to the first end of the second elongated channel member;
the method including:
positioning the first end of the second elongated channel member at a second angle to and proximate the first leg, including positioning the second elongated channel member at a third angle to the first elongated channel member;
aligning the hook of the second clip with a second opening of the first leg;
inserting the hook of the second clip into the second opening of the first leg; and
using the second fastener to move the second end of the second clip toward a surface of the second elongated channel member to cause the hook of the second clip to rotate about the second pivot protrusion, thereby engaging a second surface of the first leg.

18. The method of claim 17 further including attaching an angled plate to the first elongated channel member, the first leg, and the second elongated channel member.

19. The method of claim 15, wherein the kit further includes a slab, and wherein the method includes attaching the first elongated channel member to the slab.

20. The method of claim 15, further including attaching the second end of the first elongated channel member to a second leg.

* * * * *